US011255644B2

(12) United States Patent
Olivier et al.

(10) Patent No.: US 11,255,644 B2
(45) Date of Patent: Feb. 22, 2022

(54) THREAT DETECTION METHOD AND SYSTEM

(71) Applicant: CSIR, Pretoria (ZA)

(72) Inventors: Marius Olivier, Pretoria (ZA); Frederik Johannes Mostert, Cape Town (ZA)

(*) Notice: Subject to any disclaimer, the term of this patent is extended or adjusted under 35 U.S.C. 154(b) by 70 days.

(21) Appl. No.: 16/089,877

(22) PCT Filed: Apr. 28, 2017

(86) PCT No.: PCT/IB2017/052471
§ 371 (c)(1),
(2) Date: Sep. 28, 2018

(87) PCT Pub. No.: WO2017/187403
PCT Pub. Date: Nov. 2, 2017

(65) Prior Publication Data
US 2019/0301840 A1 Oct. 3, 2019

(30) Foreign Application Priority Data

Apr. 28, 2016 (ZA) .................................. 2016/02881

(51) Int. Cl.
*F41H 11/136* (2011.01)
*G01V 11/00* (2006.01)
(Continued)

(52) U.S. Cl.
CPC ............ *F41H 11/136* (2013.01); *F41H 11/02* (2013.01); *G01V 11/00* (2013.01); *F41H 5/007* (2013.01); *F41H 7/02* (2013.01)

(58) Field of Classification Search
CPC ................................ F41H 11/136; F41H 11/02
(Continued)

(56) References Cited

U.S. PATENT DOCUMENTS 5,592,170 A * 1/1997 Price .................... G01S 13/24
342/22
6,097,330 A * 8/2000 Kiser .................... G01S 17/74
342/45
(Continued)

FOREIGN PATENT DOCUMENTS

EP 2722633 A2 4/2014
WO 2017187403 A1 11/2017

OTHER PUBLICATIONS

F. Cremer, W. de Jong and K. Schutte, "Fusion of polarimetric infrared features and GPR features for landmine detection," Proceedings of the 2nd International Workshop onAdvanced Ground Penetrating Radar, 2003., Delft, Netherlands, 2003, pp. 222-227, doi: 10.1109/AGPR.2003.1207323. (Year: 2003).*
(Continued)

*Primary Examiner* — Marcus E Windrich
(74) *Attorney, Agent, or Firm* — Perkins Coie LLP

(57) ABSTRACT

This invention related to a method of and system for detecting a threat, particularly a threat to a vehicle associated with an explosive blast and/or detonations. The method typically comprises receiving electromagnetic signals, or data indicative thereof, via a suitable electromagnetic detector arrangement from a target area adjacent the vehicle, as well as receiving optical signals, or data indicative thereof, via a suitable optical sensor arrangement also from a target area adjacent the vehicle. The method then comprises generating a threat detect output in response to receiving an optical signal indicative of a threat subsequent to receiving an electromagnetic signal indicative of a threat. The system typically implements the method as described. The invention also extends to a vehicle comprising a system in accordance with the invention.

25 Claims, 7 Drawing Sheets

(51) Int. Cl.
*F41H 11/02* (2006.01)
*F41H 5/007* (2006.01)
*F41H 7/02* (2006.01)

(58) Field of Classification Search
USPC .......................................................... 342/22
See application file for complete search history.

(56) References Cited

U.S. PATENT DOCUMENTS

| | | | | |
|---|---|---|---|---|
| 6,473,025 | B2 * | 10/2002 | Stolarczyk | F41H 11/12 |
| | | | | 102/401 |
| 7,109,910 | B1 * | 9/2006 | Steinway | F41H 11/12 |
| | | | | 342/22 |
| 7,320,271 | B2 * | 1/2008 | Hintz | G01S 7/2923 |
| | | | | 342/22 |
| 7,684,020 | B1 | 3/2010 | Marti et al. | |
| 2008/0117098 | A1 * | 5/2008 | Johnson | G01S 7/40 |
| | | | | 342/25 F |
| 2013/0092016 | A1 | 4/2013 | Sales | |
| 2013/0328713 | A1 | 12/2013 | Svane et al. | |
| 2014/0076142 | A1 * | 3/2014 | Hyde | F41H 5/007 |
| | | | | 89/36.17 |
| 2014/0318359 | A1 * | 10/2014 | Asaf | F41H 5/007 |
| | | | | 89/36.08 |
| 2016/0217578 | A1 * | 7/2016 | Can | G01C 19/5698 |

OTHER PUBLICATIONS

International Searching Authority, International Search Report and Written Opinion, PCT Patent Application PCT/IB2017/052471, dated Jul. 17, 2017, 10 pages.

* cited by examiner

THREAT DETECTION METHOD AND SYSTEM

CROSS REFERENCE TO RELATED APPLICATIONS

This application is a U.S. National Phase under 35 U.S.C. § 371 of International Application No. PCT/IB2017/052471, filed Apr. 28, 2017, which claims priority to South Africa Application No. 2016/02881, filed Apr. 28, 2016, both of which are incorporated herein by reference in their entirety.

FIELD OF INVENTION

THIS INVENTION relates to a threat detection method and system, particularly to a blast threat detection method and system from an explosive blast or detonation.

BACKGROUND TO THE INVENTION

In combat zones and scenarios, landmines and fly-in threats are typically the largest threats to vehicles such as armoured or adapted commercial vehicles. In the case of threats being landmines, armoured vehicles are typically designed with various passive protection aspects such as V-shaped hulls, higher grounds clearances, heavier mass, thicker vehicle floors, and the like so as to mitigate damage thereto from triggered landmines encountered in the field.

Though the passive design considerations mitigate damage to armoured or adapted commercial vehicles and their occupants to a certain degree, active mitigation systems (AMS) which comprise, for example, partly electro-mechanical-explosive blast threat interrupters (BTIs) are also desirous to be used, in conjunction with passive designs, so as further to mitigate damage to the vehicles and thus protect the occupants thereof.

However, it is desirable to be able at least to detect threats early so as to allow for enough time to intervene by means of the blast threat interrupters thereby mitigating the risk of damage to vehicles, and occupants, from said threats.

SUMMARY OF THE INVENTION

According to a first aspect of the invention, there is provided a method of detecting a threat, wherein the method comprises:
  receiving electromagnetic signals, or data indicative thereof, via a suitable electromagnetic detector arrangement;
  receiving optical signals, or data indicative thereof, via a suitable optical sensor arrangement; and
  generating a threat detect output, for example, in the form of a threat detect output signal, in response to receiving an optical signal indicative of a threat subsequent to receiving an electromagnetic signal indicative of a threat.

The method may comprise generating the threat detect output in response to receiving the optical signal indicative of a threat in a pre-determined window period subsequent to receiving the electromagnetic signal indicative of a threat.

The method may comprise the steps of:
  detecting, or determining based on data indicative thereof, that the received electromagnetic signal satisfies a pre-determined condition associated with an electromagnetic signal being indicative of a threat;
  detecting, or determining based on data indicative thereof, that the received optical signal satisfies a pre-determined condition associated with an optical signal being indicative of a threat; and
  generating the threat detect output in response to detecting, or determining based on data indicative thereof, that the received optical signal satisfies the pre-determined condition in the pre-determined window period subsequent to detecting, or determining from data indicative thereof, that the received electromagnetic signal satisfies the pre-determined condition.

The step of detecting, or determining based data indicative thereof, that the received optical signal satisfies the predetermined condition may occur in one of:
  a sequential fashion in response to detecting, or determining based on data indicative thereof, that the received electromagnetic signal, satisfies the associated pre-determined condition; and
  substantially in parallel to the step of detecting, or determining based on data indicative thereof, that the received electromagnetic signal, or data indicative thereof, satisfies the associated pre-determined condition.

Notwithstanding, it will be appreciated that the step of generating a threat detect output only occurs in response to determining that a received optical signal meets the conditions in the predetermined time window or period subsequent to the detection of an electromagnetic signal indicative of a threat, or determination that an electromagnetic signal indicative of a threat has been received in a manner described herein.

t will be noted that the threat detect output signal may, for example, in any preferred format, e.g., TTL (Transistor-to-Transistor Logic), Analog, Digital, etc.

The method may be for detecting a threat to a vehicle from an explosive blast or detonation adjacent the vehicle, wherein the method comprises receiving electromagnetic and optical signals, or data indicative thereof, from a target area proximal to the vehicle. The blast or detonation may be associated with a landmine, a fly-in aerial threat, or the like to the vehicle. The target area adjacent may be under the vehicle should the threat be from landmines.

The pre-determined condition associated with the received electromagnetic signal may include a pre-determined condition selected from a group comprising a pre-determined frequency condition, a pre-determined amplitude condition, and pre-determined power content or energy density condition associated with the electromagnetic signal.

The step of detecting, or determining based on data indicative thereof, that the received electromagnetic signal satisfies the pre-determined frequency condition, may comprise detecting, or determining based on data indicative thereof, that the received electromagnetic signal has a frequency in a frequency range of between 2 MHz and 8 MHz.

The step of detecting, or determining based on data indicative thereof, that the received electromagnetic signal satisfies the pre-determined frequency condition, may comprise detecting, or determining based on data indicative thereof, that the received electromagnetic signal has a frequency of approximately 5 MHz.

The step of detecting, or determining based on data indicative thereof, that the received electromagnetic signal satisfies the pre-determined frequency condition, may comprise detecting, or determining based on data indicative thereof, that a subsequent electromagnetic signal received, in a temporal fashion, has a frequency that satisfies a pre-determined frequency condition.

The step of detecting, or determining based on data indicative thereof, that the received electromagnetic signal satisfies the pre-determined amplitude condition, may comprise detecting, or determining based on data indicative thereof, that the received electromagnetic signal has an amplitude in a predetermined amplitude range.

The method may comprise detecting, or determining based on data indicative thereof, that the received electromagnetic signal satisfies the pre-determined amplitude condition in response to detecting, or determining based on data indicative thereof, that the received electromagnetic signal satisfies the pre-determined frequency condition.

The step of detecting, or determining based on data indicative thereof, that the received electromagnetic signal satisfies the pre-determined power density or energy density condition, may comprise detecting, or determining based on data indicative thereof, that the received electromagnetic signal has a power density or energy density in a predetermined power density or energy density range.

The method may comprise detecting, or determining based on data indicative thereof, that the received electromagnetic signal satisfies the pre-determined power density or energy density condition in response to detecting, or determining based on data indicative thereof, that the received electromagnetic signal satisfies the pre-determined amplitude condition.

In one example embodiment, the method may comprise buffering, amplifying, and band pass filtering the received electromagnetic signal at approximately 5 MHz. The band pass filter may have a limited gain. In one example embodiment, the power content or energy density of the filtered signal may be obtained by integration. With an adjustable level comparator, a minimum level may be set for the detection of an electromagnetic signal of interest. To this end, the processing of the signals may be analog or digital.

The pre-determined condition associated with the received optical signal may include a pre-determined condition selected from a group comprising a pre-determined wavelength condition, a pre-determined tempo condition, and pre-determined optical amplitude condition associated with the electromagnetic signal.

The step of detecting, or determining based on data indicative thereof, that the received optical signal satisfies the pre-determined wavelength condition, may comprise detecting, or determining based on data indicative thereof, that the received optical signal has a wavelength frequency wavelength between the ultra-violet and infra-red frequency wavelength ranges.

The step of detecting, or determining based on data indicative thereof, that the received optical signal satisfies the pre-determined tempo condition, may comprise detecting, or determining based on data indicative thereof, that the received optical signal has a tempo in a predetermined tempo range.

The method may comprise detecting, or determining based on data indicative thereof, that the received optical signal satisfies the pre-determined tempo condition in response to detecting, or determining based on data indicative thereof, that the received optical signal satisfies the pre-determined wavelength condition.

The step of detecting, or determining based on data indicative thereof, that the received optical signal satisfies the pre-determined amplitude condition, may comprise detecting, or determining based on data indicative thereof, that the received optical signal has an amplitude in a pre-determined amplitude range.

The method comprise detecting, or determining based on data indicative thereof, that the received optical signal satisfies the pre-determined amplitude condition in response to detecting, or determining based on data indicative thereof, that the received optical signal satisfies the pre-determined tempo condition.

The method may comprise generating and emitting a coded optical signal as will be described below so as to counter electronic counter-warfare means.

It will be appreciated that the method may comprise transmitting the threat detect output to a suitable blast threat interrupter (BTI) device.

In one example embodiment, the received optical signal may be buffered, amplified, and low pass filtered at 25 kHz. The low pass filter may have a limited gain. An adjustable level comparator may ensure that the optical signal level is above a certain threshold. An adjustable tempo comparator may ensure that the optical signal amplitude tempo is above a certain threshold, and also that the signal is of an acceptable power density level.

I will be appreciated that the pre-determined condition/s associated with the electromagnetic and optical signals associated with a threat may be electromagnetic signatures and optical signatures associated with a threat.

According to a second aspect of the invention, there is provided system for detecting a threat, wherein the system comprises:

- an electromagnetic detector arrangement for receiving electromagnetic signals;
- an optical sensor arrangement for receiving optical signals; and
- a threat detect output module coupled to the electromagnetic detector arrangement and to the optical sensor arrangement, wherein the threat detect output module is configured to generate a threat detect output if an optical signal indicative of a threat is received within a pre-determined window period after an electromagnetic signal indicative of a threat is received.

The threat detect output module may be configured to generate the threat detect output as a threat detect output signal.

The threat detect output module may be configured to detect or determine that a received optical signal is indicative of a threat. In this regard, the threat detect output module may also be configured to detect or determine that an electromagnetic signal indicative of a threat is received by the detector arrangement.

The threat detect output module may be configured in one or both of an analogue and digital fashion to:

- determine that a received electromagnetic signal satisfies a pre-determined condition associated with an electromagnetic signal being indicative of a threat;
- determine that a received optical signal satisfies a pre-determined condition associated with an optical signal being indicative of a threat; and
- generate a threat detect output in response to determining that the received optical signal satisfies the pre-determined condition in the pre-determined window period subsequent to determining that the received electromagnetic signal satisfies the pre-determined condition.

The pre-determined condition associated with the received electromagnetic signal may include a predetermined condition selected from a group comprising a pre-determined frequency condition, a predetermined amplitude condition, and pre-determined power content or energy density condition associated with the electromagnetic signal.

The threat detect output module may be configured to determine that the received electromagnetic signal satisfies the pre-determined frequency condition by determining that the electromagnetic signal has a frequency in a frequency range of between 2 MHz and 8 MHz.

The threat detect output module may be configured to determine that the received electromagnetic signal satisfies the pre-determined frequency condition by determining that the electromagnetic signal has a frequency of 5 MHz.

The threat detector output module may comprise a filter arrangement configured to apply a band pass filter to a received electromagnetic signal at approximately 5 MHz to obtain a filtered signal. The band pass filter may have a limited gain.

The threat detect output module may be configured to determine that the received electromagnetic signal satisfies the pre-determined frequency condition by determining that a subsequent electromagnetic signal received, in a temporal fashion, has a frequency that satisfies a pre-determined frequency condition.

The threat detect output module may be configured to determine that the received electromagnetic signal satisfies the predetermined amplitude condition by determining that the received electromagnetic signal has an amplitude in a pre-determined amplitude range. This and other operations of the threat detect output module may be achieved by way of a suitable analogue or digital electronic components as the case may be.

The threat detect output module may be configured to determine that the received electromagnetic signal satisfies the pre-determined power density or energy density condition by determining that the received electromagnetic signal has a power density or energy density in a pre-determined power density or energy density range.

The threat detector output module may comprise a suitable integrator configured to obtain a received electromagnetic signal filtered by way of a suitable band pass filter at 5 MHz, and integrate the same so as to obtain a pre-determined power content or energy density in a pre-determined range or value.

The threat detector output module may comprises a suitable adjustable level comparator configured to be set at a pre-determined level for the detection of a particular electromagnetic signal having a particular frequency of interest.

The pre-determined condition associated with the received optical signal may include a pre-determined condition selected from a group comprising a pre-determined wavelength condition, a pre-determined tempo condition, and pre-determined optical amplitude condition associated with the electromagnetic signal.

The threat detector output module may be configured to determine that the received optical signal satisfies the pre-determined wavelength condition by determining that the received optical signal has a wavelength frequency wavelength between the ultra-violet and infra-red frequency wavelength ranges. For example, by way of a circuit configured to receive signals in the range or by way of comparing received signals, particularly data indicative thereof with stored pre-set data.

The threat detector output module is configured to determine that the received optical signal satisfies the pre-determined tempo condition by determining that the received optical signal has a tempo in a pre-determined tempo range. For example, by way of a circuit configured to receive signals in the range or by way of comparing received signals, particularly data indicative thereof with stored pre-set data.

The threat detector output module may be configured to determine that the received optical signal satisfies the pre-determined amplitude condition by determining that the received optical signal has an amplitude in a pre-determined amplitude range. For example, by way of a circuit configured to receive signals in the range or by way of comparing received signals, particularly data indicative thereof with stored pre-set data.

The optical sensor arrangement may comprise a suitable device configured to emit a coded optical signal, wherein the optical sensor arrangement is configured to receive reflections of such coded signals.

The system may be an on-board system located in a vehicle to detect threats thereto a vehicle from an explosive blast or detonation adjacent the vehicle.

The electromagnetic detector arrangement and the optical sensor arrangement may be mounted to the vehicle so as to receive signals from a target area proximal the vehicle.

The electromagnetic sensor arrangement may comprise suitable sensors configured to sense electromagnetic signals, and wherein the optical sensor arrangement comprises suitable sensors to sense optical signals.

The system may comprise a blast threat interrupter operable on receipt of the blast detect output.

According to a third aspect of the invention, there is provided a vehicle comprising a system as herein described.

According to a fourth aspect of the invention, there is provided a method of detecting a threat, wherein the method comprises:
  detecting or determining if at least one electromagnetic signal received via an electromagnetic detector arrangement meets one or more predetermined conditions indicative of a threat; and
  generating a threat detect output if an optical signal received via a suitable optical sensor arrangement meets one or more pre-determined conditions indicative of a threat subsequent to detecting or determining that the received electromagnetic signal meets one or more pre-determined conditions indicative of a threat.

According to a fifth aspect of the invention, there is provided a non-transitory computer readable medium having instructions thereof which when executed on one or more processors cause the same to perform any one of the methods described herein.

DETAILED DESCRIPTION OF THE DRAWINGS

The following description of the invention is provided as an enabling teaching of the invention. Those skilled in the relevant art will recognise that many changes can be made to the embodiment described, while still attaining the beneficial results of the present invention. It will also be apparent that some of the desired benefits of the present invention can be attained by selecting some of the features of the present invention without utilising other features. Accordingly, those skilled in the art will recognise that modifications and adaptations to the present invention are possible and can even be desirable in certain circumstances, and are a part of the present invention. Thus, the following description is provided as illustrative of the principles of the present invention and not a limitation thereof.

Figure 1:
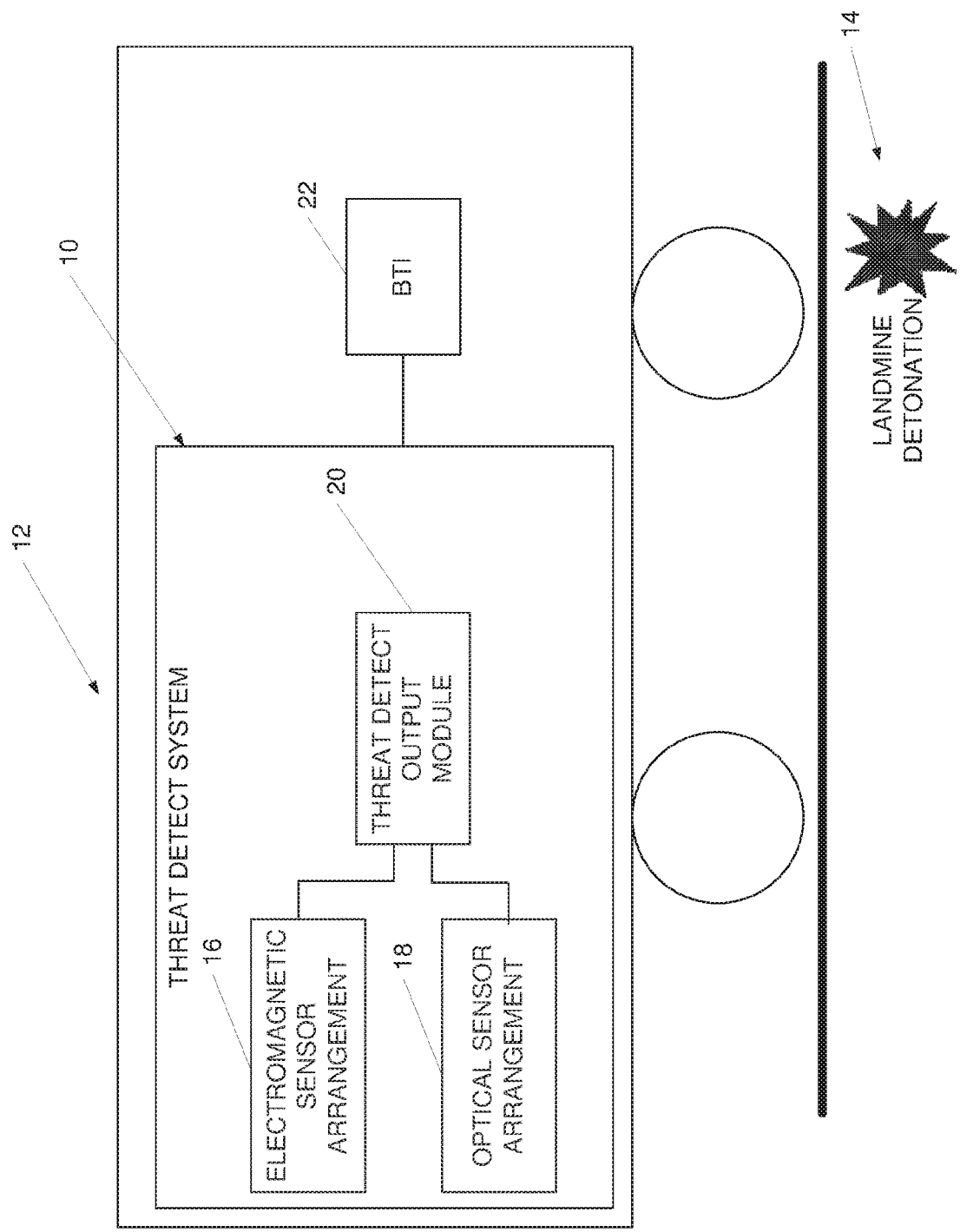
FIG. 1 shows a schematic diagram of a system in accordance with an example embodiment of the invention in a vehicle in accordance with an example embodiment of the invention.

Referring to FIG. 1 of the drawings where a threat detect system in accordance with an example embodiment of the invention is generally indicted by reference numeral 10. The threat detect system 10 is incorporated in a vehicle 12, particularly an armoured or adapted vehicle typically for use in combat scenarios. In this regard, the threat detect system 10 is typically employed to detect threats, particularly of a military nature, to the vehicle 12 in the form of fly-in threats such as rocket-propelled grenades (RPGs), and land mines detonated by the travelling of the vehicle 12 thereon, typically under the vehicle 12. The vehicle 12 may be selected from a group comprising an automobile, truck, pick-up, sport utility vehicle, tank, armoured vehicle, or the like configured to traverse on a surface, though nothing precludes the vehicle 12 being in the form of any other moving object, for example, an aircraft, or a water vessel such as a boat.

For ease of explanation, reference will be made to the threat detect system 10 being used to detect a land mine detonation from a land mine 14 buried beneath a surface which the vehicle 12 traverses.

Figure 2:
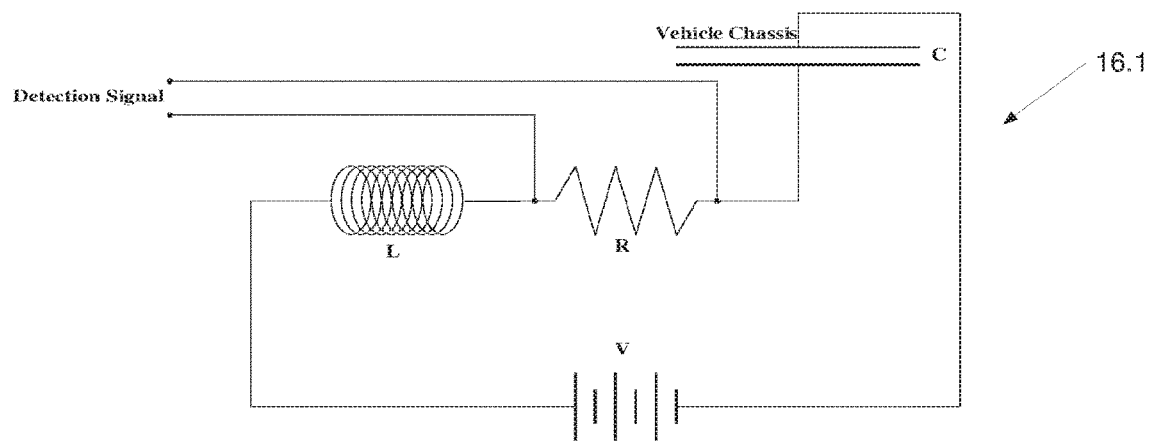
FIG. 2 shows a schematic diagram of an electromagnetic detector arrangement in accordance with an example embodiment of the invention.
Figure 3:
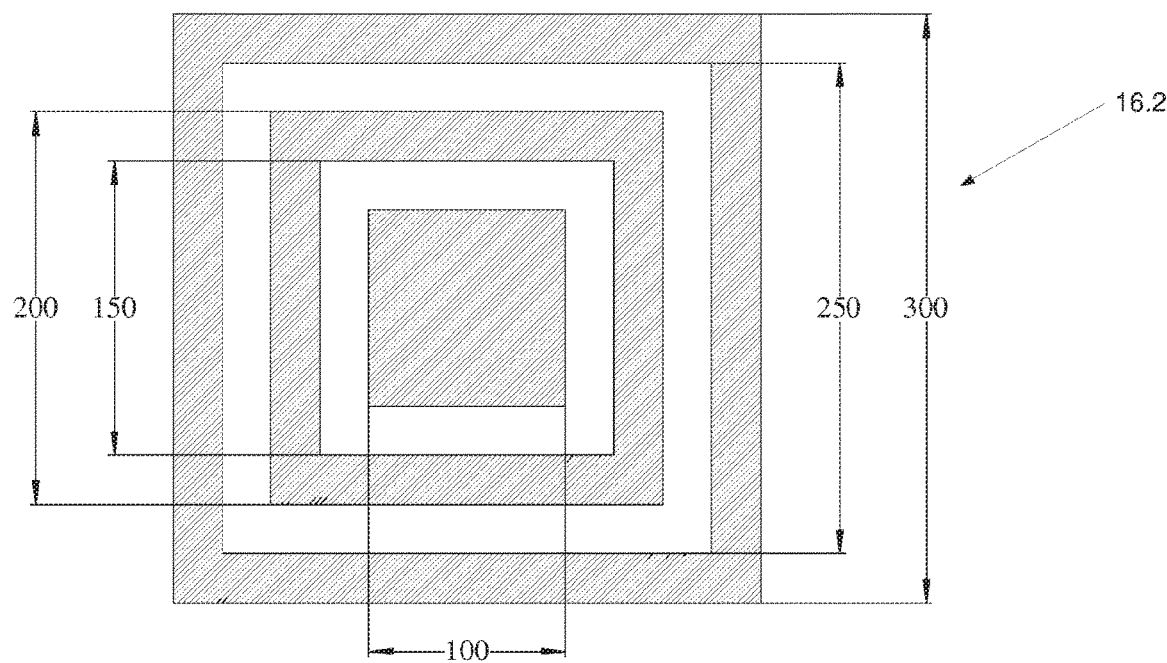
FIG. 3 shows a schematic diagram of an electromagnetic antenna in accordance with an example embodiment of the invention.

The threat detect system 10 comprises electromagnetic detector arrangement 16 for detecting or sensing electromagnetic signals. In one example embodiment, the detector arrangement 16 comprises a suitable electromagnetic sensing circuit 16.1 as illustrated in FIG. 2 and an antenna 16.2 as illustrated in FIG. 3.

The circuit 16.1 may be a conventional circuit comprising a power source and conventional electronic components such as those selected from a group comprising resistors, capacitors, inductors, and the like for detecting and/or sensing electromagnetic signals received by the antennae 16.2. The antennae 16.2 as illustrated in FIG. 3 is typically, but not limited to, a planar antenna etched on printed circuit board or constructed of thin aluminium strips cut in concentrically arranged squares so as to detect electromagnetic signals associated with a detonation of land mine 14. The antenna 16.2 is typically located flush on the vehicle 12, for example, under the vehicle and is configured to sense and/or detect signals between at least a 2 to 8 MHz range.

Figure 4:
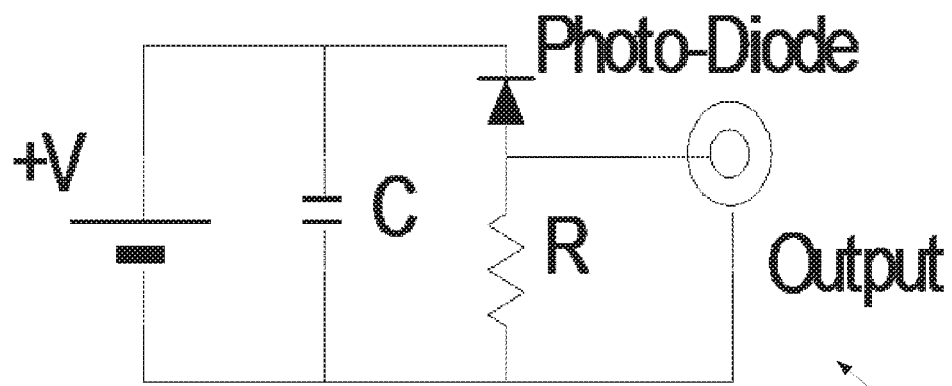
FIG. 4 shows a schematic diagram of an optical sensor arrangement in accordance with an example embodiment of the invention.

The system 10 in FIG. 1 also comprises an optical sensor arrangement 18 for detecting or sensing optical signals. Referring to FIG. 4 of the drawings, the optical sensor arrangement 18 comprises a suitable optical sensor as a circuit 18.1 so as to detect optical signals, for example, those associated with the detonation of the land mine 14 under the vehicle 12. The optical sensor arrangement 18, typically the circuit 18.1 may comprise a suitable power source and electronic components, such as those selected from a group comprising resistors, capacitors, and/or the like. The arrangement 18, particularly the circuit 18.1, comprises a suitable photodiode positioned under the vehicle 12 and is configured to sense optical signals between the UV and infrared frequency wavelength ranges or between 250 nm and 950 nm. In one example embodiment, the optical sensor arrangement 18 may actively illuminate the area under the vehicle 12 by coded ultraviolet/Infrared transmitters so as to not generate false signals by counter electronic warfare techniques.

Both sensors arrangements 16, 18 effectively monitor a target area adjacent the vehicle to detect a threat. In the present example embodiment under discussion, the system 10 effectively monitors a target area underneath the vehicle 12 as the vehicle traverses a terrain so as to detect an explosive blast and/or detonation from a landmine, for example, triggered by the vehicle 12.

The threat detect system 10 further comprises threat detect output module 20 operable to generate a threat detect output, for example, in the form of a threat detect output signal as will be discussed below.

It will be appreciated by those skilled in the field of invention that the threat detect output module 20 may be implemented by: analogue components and circuitry such as operational amplifiers, transistors, diodes, resistors, and the like, for example, to provide suitable logic gates; one or more processors such as one or more microcontrollers, field programmable gate arrays (FPGAs), or a combination of analogue and processor based digital components to achieve the functionality described herein. In this regard, it will be appreciated that the term "module" in the specification may be interpreted as analogue circuitry, an identifiable portion of code, computational, or executable instructions, data, or computational object to achieve a particular function, operation, processing or procedure. It follows that a module need not be implemented in software or hardware. A module may be implemented in software, hardware or a combination of software and hardware. Further, the modules need not be incorporated into one device or component but may be spread across a plurality of devices and/or components.

In the case of the module 20 being provided by a processor, the processor may operate under a set of non-transitory computer executable instructions stored in a processor memory or external memory which when executed causes the processor to provide the functionality of the module 20 described herein. The processor may thus comprise electromagnetic and optical receiver modules (not shown) operable to receive data corresponding to the electromagnetic and optical signals detected by the arrangements 16 and 18 respectively, either in a selective fashion, i.e., only signals of interest are received, or a non-discriminatory fashion wherein all sensed signals are received and the discrimination is achieved by the module 20 as those skilled in the art will understand.

Though the module 20 is described herein as a separate module to the arrangement 16, 18, it will be understood that components and/or functions of the arrangements 16, 18 may overlap.

I will be noted that the vehicle 12 may comprise a Blast Threat Interrupter (BTI) 22 unit communicatively coupled to the system 10 so as to receive the threat detect signal generated thereby as will be discussed below. The BTI 22 may be a conventional electro-mechanical device operable to mitigate damage done to the vehicle 12 and its occupants upon detection of the detonation of the landmine 14 underground. In some example embodiments, the system 10 may further comprise the BTI 22.

In some example embodiments, the system 10 may comprise a suitable power supply unit, for example, a primary or re-chargeable battery or means to draw power from the vehicle 12 in a conventional manner to provide power to the system 10, including the power to the arrangements 16, 18. To this end, it will be appreciated by those skilled in the field of invention that certain components, circuitry, for example, drivers, etc. are omitted from the drawings for ease of illustration.

Operation of the system 10, will be explained, in use, with reference to FIGS. 5 to 10, particularly FIGS. 5 and 6 which show flow diagrams of example methods in accordance with the invention. Though the methods of FIGS. 5 and 6 are explained with reference to the system 10, it will be appreciated by those skilled in the field of invention that the example methods may be used with other systems, not described herein as the case may be.

Figure 5:
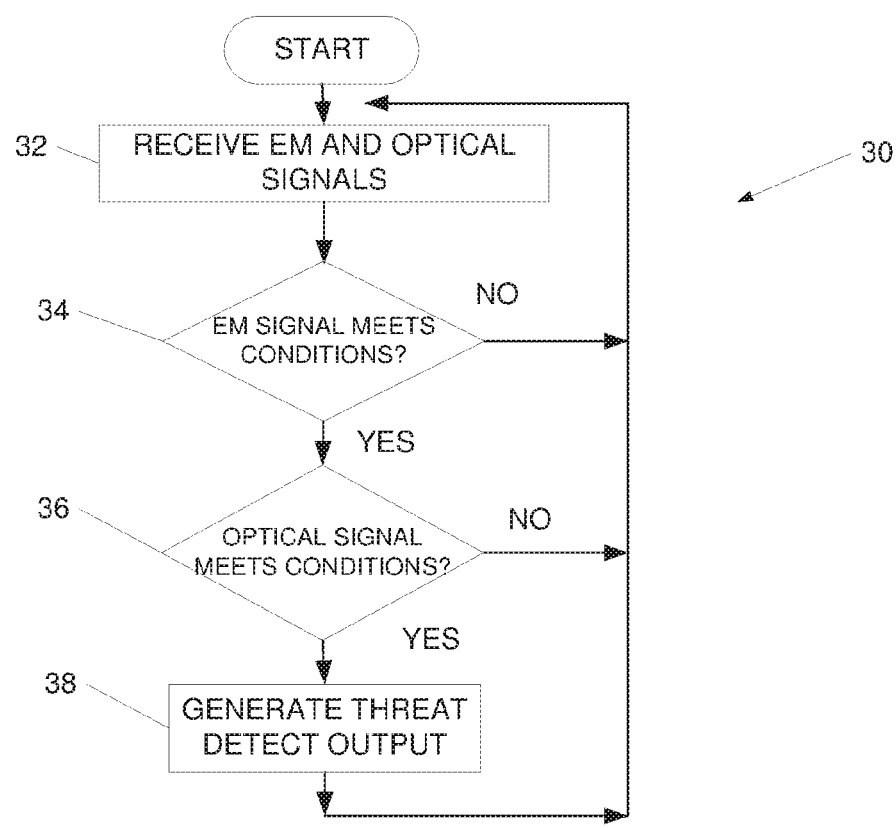
FIG. 5 shows a high level block flow diagram of a method in accordance with an example embodiment of the invention.
Figure 6:
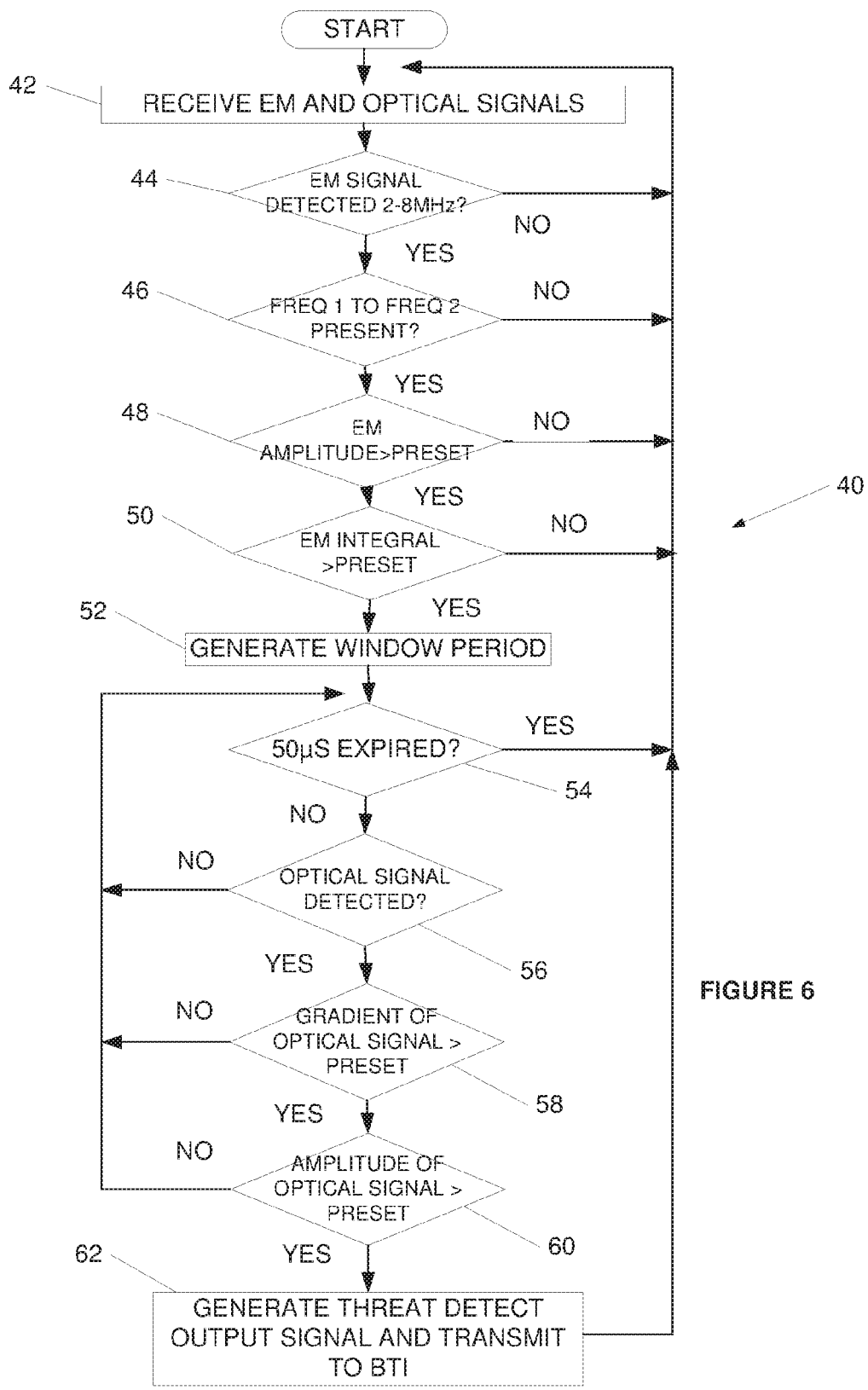
FIG. 6 shows a low level block flow diagram of a method in accordance with an example embodiment of the invention.

Referring to FIG. 5, a flow diagram of a high level method in accordance with an example embodiment of the invention is generally indicated by reference numeral 30. The method 30 is typically implemented by the system 10 and comprises the steps of resetting the system 10 and powering up the sensor arrangements 16, 18. This is typically done automatically on startup of the vehicle 12 or manually when the vehicle is in a combat area. The method 30 is essentially a high level method for detecting detonation of a landmine 14 beneath the vehicle 12.

As the vehicle 12 traverses a surface, the method 30 comprises receiving, at block 32, electromagnetic and optical signals, or data indicative thereof, via the electromagnetic and optical detector/sensor arrangements 16, 18 from a zone adjacent or under the vehicle 12, particularly underneath the vehicle 12. In this regard, it will be appreciated that the term "receiving" in this regard may be also understood to mean detecting or sensing by way of the arrangements 16, 18 as opposed to selective signals being transmitted by the arrangements 16, 18 for receipt by, for example, module 20.

In response to receiving an electromagnetic signal, the method 30 may comprise detecting or determining, at block 34, by way of the threat detect module 20 whether the received electromagnetic signal satisfies or meets a pre-determined condition indicated with a threat, in particular a pre-determined condition associated with an electromagnetic signal which is associated with a threat. In this regard it will be noted that reference to the word "a" need not necessarily be construed as reference to "one" but may be understood to mean "at least one". In this regard, the pre-determined condition may be one or more pre-determined conditions associated with a threat. The pre-determined conditions may be a function, for example, a mathematical model/function and/or may be related to the depth of the landmine detonated 14, the type of surface material in which the landmine 14 is buried in, etc. It follows that the pre-determined condition is related to the threat to be detected.

The step 34 may be done by the module 20 in an analogue fashion by using analogue components which process analogue outputs received from the electromagnetic detector arrangement 16 corresponding to the electromagnetic signal sensed or detected thereby to essentially detect that a received electromagnetic signal from the arrangement 16 is indicative of a threat. Alternately, the step at block 34, implemented by the module 20 may be implemented by a processor which processes digital data indicative of electromagnetic signals received by the electromagnetic receiver arrangement 16, for example, from a suitable analogue to digital converter (not shown) operatively connected to or forming part of the arrangement 16. It will be appreciated that the data indicative of or corresponding to the electromagnetic signals sensed by the electromagnetic detector arrangement 16 may be stored in a suitable memory device. In any event, the module 20 is operable to detect or determine whether the attributes of the received electromagnetic signal, or data associated satisfy or substantially matches with pre-determined and/or pre-set values indicative of a threat as will be described below.

Figure 7:
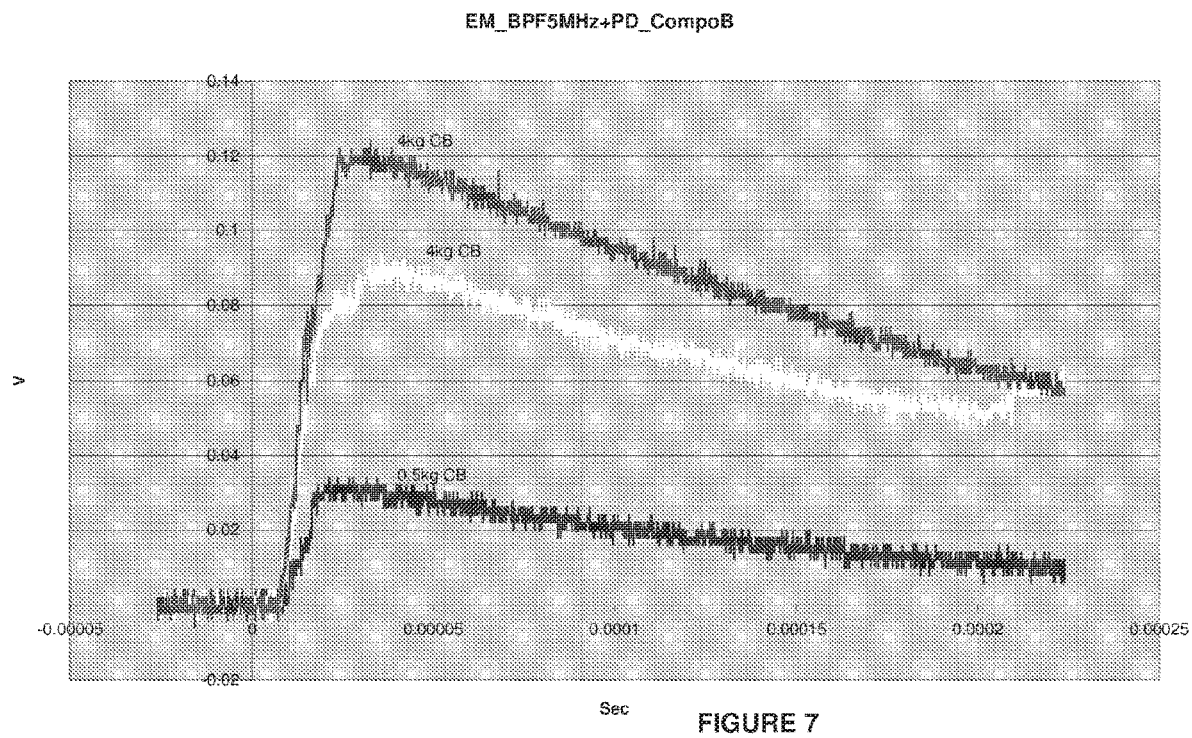
FIG. 7 shows a graph of electromagnetic detector arrangement outputs in accordance with an example embodiment of the invention.

Graphs of example filtered outputs from the detector arrangement 16 for different charges detonated in moist sand, as part of an experimental setup, are illustrated in FIG. 7. From the graph of FIG. 7, it will be noted that useful signals are detected at around 8 μs from detonation of the charge. The larger charge of 4 kg renders larger signal amplitude than the 0.5 kg charge detonation and can be described to the higher power density level in the 4 kg charge signal at nominal 5 MHz.

It follows that in one example embodiment, the step 34 may comprise detecting or determining if a received electromagnetic signal has a frequency of approximately 5 MHz.

In response and subsequent to the module 20 detecting or determining that the received electromagnetic signal satisfies or meets one or more pre-determined conditions, the method 30 comprises detecting or determining, at block 36, also by way of the threat detect module 20 whether a particular optical signal received by the arrangement 18 satisfies or meets one or more pre-determined conditions associated with a threat. The pre-determined conditions may be a function, for example a mathematical model/function and/or may be related to the depth of the landmine detonated 14, the type of surface material in which the landmine 14 is buried in, etc. In some example embodiments, the method 30 may comprise operating the sensor arrangement 18 to receiving optical signals in response to detecting or determining that the received electromagnetic signal satisfies and/or meets the one or more pre-determined conditions. However, it will be appreciated that this need not be the case as the arrangement 18 may receive optical signals in a continuous fashion though the step of determining if a received optical signal is indicative of a threat only occurs subsequent to determining that an electromagnetic signal is indicative of a threat.

It will be noted that the step of block 36 may be done by the module 20 in an analogue fashion by using analogue components which process analogue outputs received from the optical sensor arrangement 18 corresponding to the optical signal sensed or detected thereby to essentially detect that a received optical signal is indicative of a threat. Alternately, the step at block 36 may be implemented by a processor which processes digital data indicative of the signals received from the optical receiver arrangement 18, for example, from a suitable analogue to digital converter, corresponding to the optical signals sensed by the arrangement 18 with data stored in a suitable memory device. In any event, it will be appreciated that the module 20 may be operable to determine whether a received optical signal has attributes which satisfy or meets pre-determined and/or pre-set values indicative of a threat as will be described below.

Figure 8:
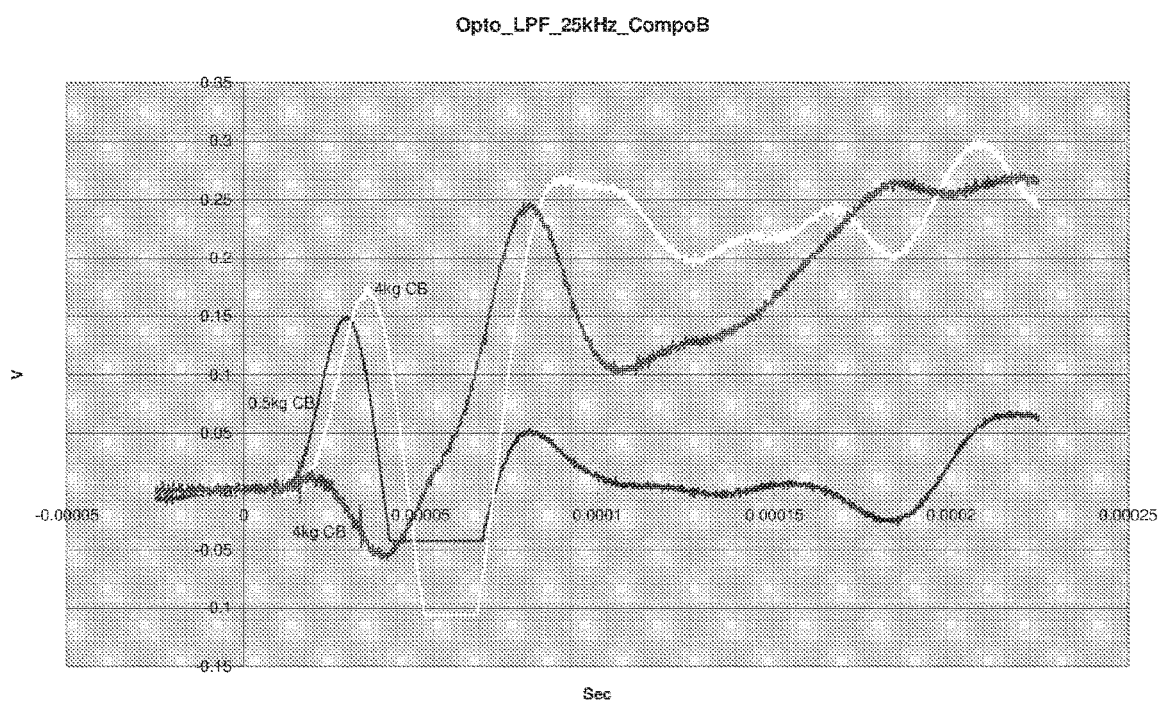
FIG. 8 shows a graph of optical sensor arrangement outputs in accordance with an example embodiment of the invention.

Graphs of example filtered outputs from the sensor arrangement 18 for different charges detonated in moist sand, as part of an experimental setup, are illustrated in FIG. 8. From the graphs of FIG. 8, it will be noted that a useful signal is detected at around 20 µs from detonation of the charge. It will be appreciated that dipping of the signals is a result of the scale and zero level chosen on the oscilloscope or data acquisition system used to obtain the graphs.

In one example embodiment, the step 36 may comprise determining that the received optical signal is between the ultraviolet (UV) and infrared (IR) frequency ranges within a pre-determined time after step 34 above, as will be explained further below.

In response to the module 20 determining that the received optical signal meets the one or more pre-determined conditions, the method 30 may comprise electronically generating a threat detect signal, at block 38, by way of the module 20 which indicates that a landmine adjacent or under the vehicle 12 has been detonated.

The method 30 may also comprise the step of transmitting the generated blast detect signal to the BTI 24 so as to mitigate the effects of the landmine which the vehicle 12 has detonated.

Referring to FIG. 6 of the drawings where a flow diagram of a method in accordance with an example embodiment of the invention is generally indicated by reference numeral 40. It will be appreciated that the method 40 is a more detailed description of the high level method 30 as described above.

In any event, as the vehicle 12 traverses a surface, the method 40 comprises receiving, at block 42, electromagnetic and optical signals via the sensor arrangements 16, 18, as described above. The method 40 comprises detecting or determining, at block 44 if an electromagnetic signal in the frequency range of 2-8 MHz is received, by the electromagnetic detector 16 arrangement. As described herein, this may be done by circuitry associated with the arrangement 16 tuned, or set at a level to detect only signals between the aforementioned frequency range. Instead, as will be understood, this may be achieved by the module 20 comparing data indicative of a signal sensed by the arrangement 16 to determine r the signal falls within the frequency range.

In a preferred example embodiment, the detector arrangement 16 is tuned to a nominal frequency of 5 MHz as it will be appreciated that frequency manifests early in the detonation process. To this end, the received electromagnetic signal from the arrangement 16 is buffered, amplified, and analogue band pass filtered at approximately 5 MHZ (this is where the highest power density of the captured raw electromagnetic signal is generally received). In this example embodiment, the band pass filter has a limited gain, and with an adjustable level comparator, a minimum level can be set.

If the received electromagnetic signal is within the aforementioned frequency range of 2 to 8 MHZ, the method 40 may comprise the step, at block 46 of detecting, or determining from data indicative thereof, whether a subsequent temporally received electromagnetic signal is within further frequency ranges of Freq1 and Freq2, for example, between 2-5 MHz, and/or 5-8 MHz range, so as to counter electronic warfare techniques seeking to upset the system 10 and thus provide false alarms.

If indeed the more frequencies are present, this is indicative of a potentially viable electromagnetic signal, thus the method 40 may comprise detecting or determining, at block 48 via module 20, if the received electromagnetic signal has an amplitude which exceeds a pre-determined pre-set electromagnetic amplitude. This pre-determined pre-set may be a function of the total gain of the EM signal processing circuitry (e.g. 50 mV). The module 20 may thus be operable to compare the amplitude of the received electromagnetic signal with the pre-set amplitude to perform said detection or determination. The electromagnetic amplitude is correspondent to the explosive mass of detonation and it follows that this step discriminates for threat mass where a non-threatening explosive mass would correspondingly not result in a threat detect signal trigger.

In response to determining that the electromagnetic amplitude exceeds the said pre-set amplitude, the method 40 may comprise detecting or determining, at block 50 via module 20, if the received electromagnetic signal has an electromagnetic integral greater than a pre-determined pre-set value. This may be achieved by a suitable power density gate wherein gain, level/value depends on the time constant of the integration (i.e. the value of the R-C components used to integrate the signal; or when digital, the integration time. To this end it will be appreciated that the module 20 may be configured to compare the power density of the received electromagnetic signal with that of the pre-set value so as to perform said detection or determination which in turn relates to the proximity of the detonation. A detonation within 1.5 meters is typically of interest to the system 10 for the purposes of generating a threat detect signal. The level comparator has adjustable "reference" only (not gain), which detects the level of the power density signal.

In response to detecting or determining that the received electromagnetic signal has an integral value which is greater than the pre-set value, the method 40 comprise implementing or generating a window period of approximately 50 µs or a confirmation gate, at block 52 via module 20, to confirm that an optical event took place within between said time window. This is because the detonation of a landmine 14 has a characteristic optical signal emission or signature subsequent to a characteristic electromagnetic emission or signature, particularly within a particular time window after the electromagnetic emission therefrom.

It will be noted that the module 20 may comprise a suitable timer, clock, or correspondent circuitry to implement or in other words start a timed count for the window period.

In particular, the method 40 comprises determining, at block 54 via module 20, if the time window of approximately 50 µs has expired and if not, the method 40 comprises detecting or determining, at block 56 via module 20 or arrangement 18, r an optical signal from the optical sensor arrangement 18 in the UV or IR frequency ranges has been received in the time window.

If the optical signal has been received, the method 40 comprises the step of detecting or determining, at block 58 by way of module 20, if the gradient of the optical signal received is greater than a predetermined pre-set value. In other words, the method 40 may comprise determining tempo of the optical signature change is greater than a pre-set level. In this regard, the zone which the optical sensor arrangement 18 senses, typically under the vehicle 12, may be actively illuminated by coded UV/IR transmitters so as to minimise electronic warfare threats and false alarms associated therewith. In this regard, it will be noted that in some example embodiments, the sun emits and illuminates the area adjacent and under the vehicle 12 (by means of scattering and reflections)—the optical sensor arrangement 18 detects the change in this illuminated area as a result of the "sand bubble" popping from the surface caused by the detonation. In the case of the coded illumination, said coded illumination replaces the sun, thereby creating a controllable signature under the vehicle (day and night), and simultaneously counters electronic warfare.

In response to determining that the gradient of the optical signal is greater than said present, the method 40 may comprise detecting or determining, at block 60 via module 20, whether the amplitude of the received optical signal is greater than a pre-determined preset. This level may be determined by the gain of the optical signal processing circuitry of the arrangement 18, as well as the illumination level of the coded UV/IR transmitters.

In one example embodiment the optical signal received by the optical sensor arrangement 18 is buffered, amplified, and analogue low pass filtered at 25 kHz, at blocks 58 and 60. The low pass filter has a limited gain. An adjustable level comparator ensures that the optical signal level is above a certain threshold, and also that the signal is of an acceptable power density level, at block 60.

In any event, it will appreciated in response to determining that the optical signal amplitude is greater than the pre-set value, the method 40 may comprise at block 62 generating a threat detect signal and outputting the same to a BTI 24 by way of module 20 in a manner as described above. It will be appreciated that if the 50 µs window is closed and a suitable optical signal which meets the pre-set conditions is not received, the method 40 may comprise resetting the method 40. Similarly if an unsuitable electromagnetic signal is received, the method 40 is restarted. It will be appreciated that the method 40 is a continuous method which continuously loops as the vehicle 12 traverses a surface.

In one example embodiment, one or all the steps of detecting and determining as mentioned above by way of the module 20 may be achieved by way of suitable pre-configured analogue comparators as will be understood in the field of invention. Instead, or in addition, one or all the steps of detecting and determining as mentioned above by way of the module 20 may be achieved digitally by way of a suitable processor and data stored on a suitable memory device.

It will be understood that though the methods 30 and 40 of FIGS. 5 and 6 show looped method after a threat detect output/output signal, it will be appreciated that the methods 30 and 40 may end at the generation of the threat detect output/output signal at steps 38, and 62 respectively.

Figure 9:
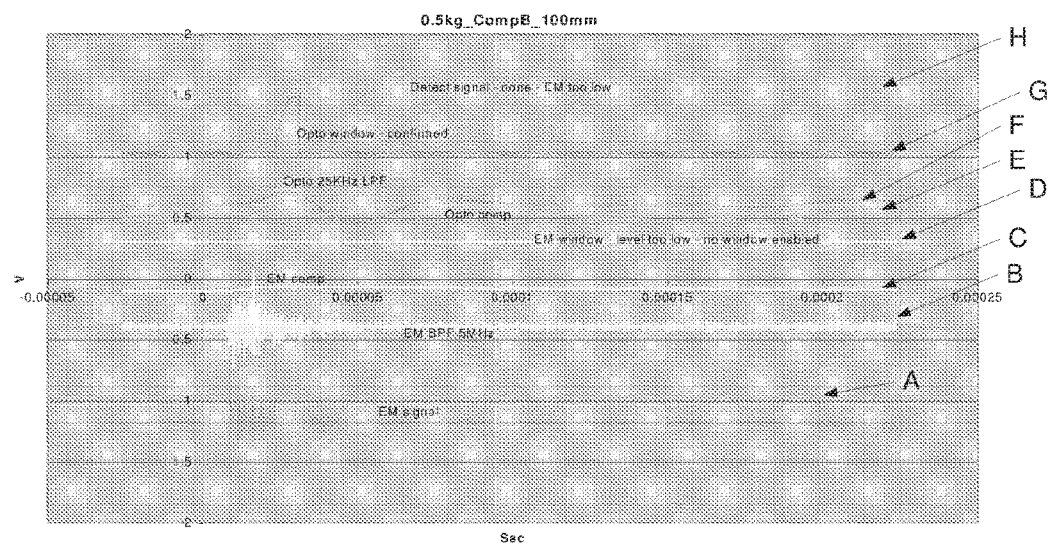
FIG. 9 shows a graph of the system output for a 0.5 kilogram explosive charge buried in 100 millimeters of moist soil.
Figure 10:
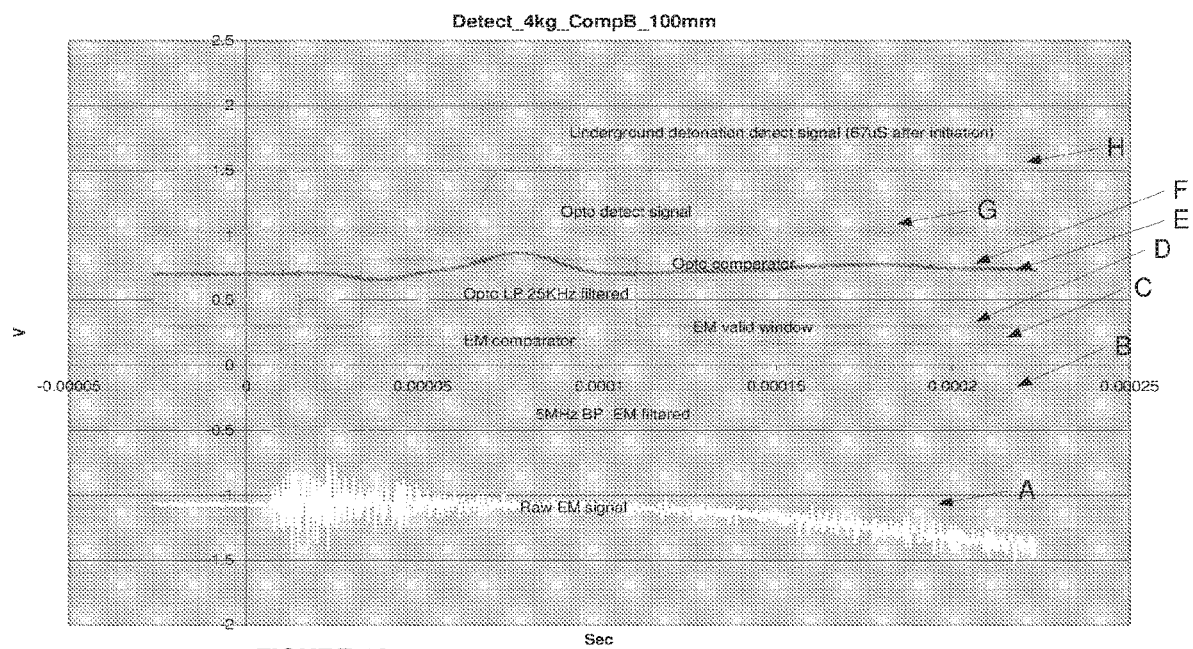
FIG. 10 shows a graph of the system output for a 4 kilogram explosive charge buried in 100 millimeters of moist soil.
Figure 11:
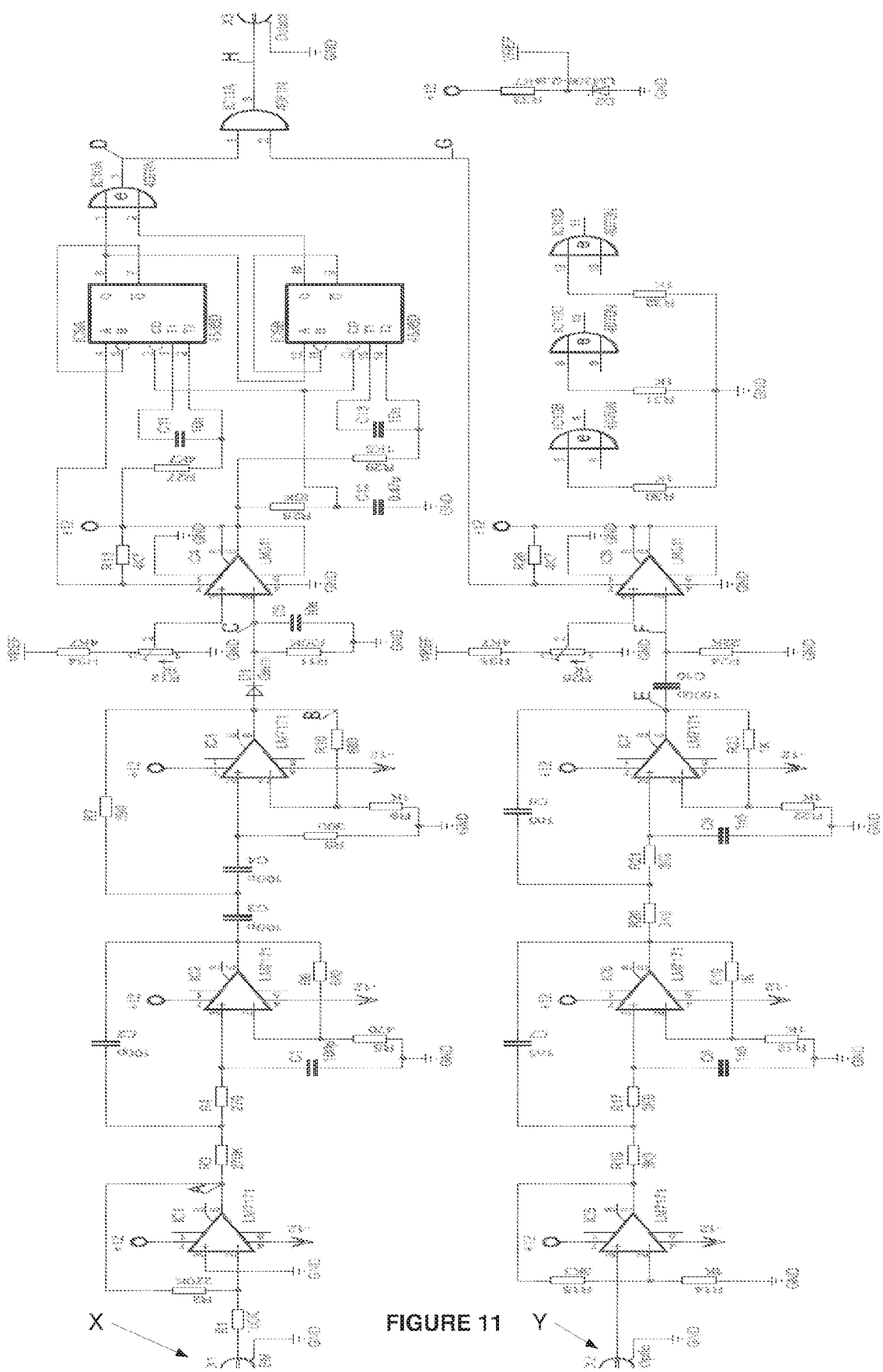
FIG. 11 shows a schematic circuit diagram of a system in accordance with an example embodiment of the invention.

Referring to FIGS. 9 to 11 of the drawings, wherein outputs of an analogue embodiment of a system 100 in accordance with an example embodiment of the invention are illustrated. It will be understood that the system 100 is typically comprised of analogue components such as suitable operational amplifiers, resistors, capacitors, diodes, gates (viz., AND, OR), comparators, suitable wiring/soldering, and the like suitable to provide functionality of the system 100 in a substantially similar way to system 10 as described herein. It follows that the system 100 is substantially similar to the system 10 described above and as such it will be appreciated that descriptions provided above may apply hereto. However, it will be noted that the system 100 does not illustrate the arrangements 16, 18 but merely illustrates the outputs, or signals from the said arrangements 16, 18, being received at X and Y. To this end, it will be appreciated that the majority of the system 100 may be suitable to performing the steps of module 20.

In any event, FIG. 9 shows outputs of system 100 for a 0.5 kg charge buried in 100 mm moist soil. To ease the understanding of the graph of FIG. 9, events A to H as they take place sequentially through the system 100 at various points in the system 100 are positioned from bottom to top in the graph as they "run" sequentially through the system 100 in time. Therefore, the raw electromagnetic data A from the arrangement 16 is first from the bottom, then the 5 MHz band pass filtered electromagnetic signals B which is power density C weighted and fed into an electromagnetic comparator as implemented by module 20 which decides, based on the level which is adjustable, whether the valid time window may be activated D. In this case, in FIG. 9, the EM level and/or the power density was too low (for an 0.5 kg explosive charge simulating a large anti-personnel mine) and thus no threat detect signal H is generated. In FIG. 9, the optical signal sensor arrangement 18 detected an optical signal of amplitude (level) E and power density F indicative of a detonation within the window period G. However, without a valid electromagnetic signal, no threat detect signal H can be issued. Thus, the 0.5 kg blast is rejected by the system as being potentially dangerous to the vehicle.

Referring to FIG. 10 of the drawings, FIG. 10 is substantially similar to that of FIG. 9. However, FIG. 10 is associated with a 4 kg explosive charge (simulating a small landmine). In this example embodiment a valid time window was generated in which to monitor for a suitable optical signal. In the graph of FIG. 10 one may note that a detect signal H was issued after 67µs thus providing enough time for a BTI 24 to be able to react.

The invention as described herein provides a convenient manner and methodology in which to rapidly detect detonation of a landmine threat to a vehicle so as to be able to timeously operate blast threat interrupter devices. The invention as described herein may thus provide a convenient manner in which to be able to detect a threat after detonation but within a timeframe of which will enable blast mitigation actions to be taken.

The invention claimed is:

1. A method of detecting a threat to a vehicle from a detonation of a land mine buried beneath a surface on which the vehicle traverses, wherein the method comprises:
   receiving electromagnetic signals, or data indicative thereof, via a suitable electromagnetic detector arrangement mounted to the vehicle, wherein the electromagnetic detector arrangement comprises a suitable electromagnetic sensing circuit and an antenna configured to sense and/or detect signals between 2 MHz and 8 MHz;
   receiving optical signals, or data indicative thereof, via a suitable optical sensor arrangement comprising a suitable optical sensor in the form of a circuit comprising a suitable photodiode positioned under the vehicle; and
   generating a threat detect output signal via a threat detect output module provided in the vehicle in response to receiving, from the optical sensor arrangement, an optical signal indicative of a threat to the vehicle, from a detonation of a land mine buried beneath the surface on which the vehicle traverses, in a pre-determined window period subsequent to receiving, from the electromagnetic detector arrangement, an electromagnetic signal, in a frequency range between 2 MHz and 8 MHz, indicative of a threat to the vehicle, from a detonation of a land mine buried beneath the surface on which the vehicle traverses, wherein the generated threat detect output signal is indicative of the detonation of a land mine adjacent or under the vehicle.

2. A method as claimed in claim 1, wherein the method comprises:
   detecting, or determining based on data indicative thereof, that the received electromagnetic signal satisfies a pre-determined condition associated with an electromagnetic signal being indicative of a threat;
   detecting, or determining based on data indicative thereof, that the received optical signal satisfies a pre-determined condition associated with an optical signal being indicative of a threat; and
   generating the threat detect output signal in response to detecting, or determining based on data indicative thereof, that the received optical signal satisfies the pre-determined condition in the pre-determined window period subsequent to detecting, or determining from data indicative thereof, that the received electromagnetic signal satisfies the pre-determined condition.

3. A method as claimed in claim 2, wherein the pre-determined condition associated with the received electromagnetic signal includes a pre-determined condition selected from a group comprising a pre-determined frequency condition, a pre-determined amplitude condition, and pre-determined power content or energy density condition associated with the electromagnetic signal.

4. A method as claimed in claim 3, wherein in detecting, or determining based on data indicative thereof, that the received electromagnetic signal satisfies the pre-determined frequency condition, the method comprises detecting, or determining based on data indicative thereof, that a subsequent electromagnetic signal received, in a temporal fashion, has a frequency that satisfies a pre-determined frequency condition.

5. A method as claimed in claim 3, wherein in detecting, or determining based on data indicative thereof, that the received electromagnetic signal satisfies the pre-determined amplitude condition, the method comprises detecting, or determining based on data indicative thereof, that the received electromagnetic signal has an amplitude in a pre-determined amplitude range.

6. A method as claimed in claim 5, wherein the method comprises detecting, or determining based on data indicative thereof, that the received electromagnetic signal satisfies the pre-determined amplitude condition in response to detecting, or determining based on data indicative thereof, that the received electromagnetic signal satisfies the pre-determined frequency condition.

7. A method as claimed in claim 5, wherein in detecting, or determining based on data indicative thereof, that the received electromagnetic signal satisfies the pre-determined power density or energy density condition, the method comprises detecting, or determining based on data indicative thereof, that the received electromagnetic signal has a power density or energy density in a pre-determined power density or energy density range.

8. A method as claimed in claim 7, wherein the method comprises detecting, or determining based on data indicative thereof, that the received electromagnetic signal satisfies the pre-determined power density or energy density condition in response to detecting, or determining based on data indicative thereof, that the received electromagnetic signal satisfies the pre-determined amplitude condition.

9. A method as claimed in claim 2, wherein the pre-determined condition associated with the received optical signal includes a pre-determined condition selected from a group comprising a pre-determined wavelength condition, a pre-determined tempo condition, and pre-determined optical amplitude condition associated with the optical signal.

10. A method as claimed in claim 9, wherein in detecting, or determining based on data indicative thereof, that the received optical signal satisfies the pre-determined wavelength condition, the method comprises detecting, or determining based on data indicative thereof, that the received optical signal has a wavelength frequency wavelength between the ultra-violet and infra-red frequency wavelength ranges.

11. A method as claimed in claim 9, wherein in detecting, or determining based on data indicative thereof, that the received optical signal satisfies the pre-determined tempo condition, the method comprises detecting, or determining based on data indicative thereof, that the received optical signal has a tempo in a pre-determined tempo range.

12. A method as claimed in claim 11, wherein the method comprises detecting, or determining based on data indicative thereof, that the received optical signal satisfies the pre-determined tempo condition in response to detecting, or determining based on data indicative thereof, that the received optical signal satisfies the pre-determined wavelength condition.

13. A method as claimed in claim 10, wherein in detecting, or determining based on data indicative thereof, that the received optical signal satisfies the pre-determined amplitude condition, the method comprises detecting, or determining based on data indicative thereof, that the received optical signal has an amplitude in a pre-determined amplitude range.

14. A method as claimed in claim 13, wherein the method comprises detecting, or determining based on data indicative thereof, that the received optical signal satisfies the pre-determined amplitude condition in response to detecting, or determining based on data indicative thereof, that the received optical signal satisfies the pre-determined tempo condition.

15. A method as claimed in claim 1, wherein the method comprises generating and emitting a coded optical signal.

16. A method as claimed in claim 1, wherein the method comprises transmitting the threat detect output to a suitable blast threat interrupter (BTI) device.

17. A system for detecting a threat to a vehicle from a detonation of a land mine buried beneath a surface on which the vehicle traverses, wherein the system comprises:
   an electromagnetic detector arrangement mounted to the vehicle for receiving electromagnetic signals, wherein the electromagnetic detector arrangement comprises a suitable electromagnetic sensing circuit and an antenna configured to sense and/or detect signals between 2 MHz and 8 MHz;
   an optical sensor arrangement comprising a suitable optical sensor in the form of a circuit comprising a suitable photodiode positioned under the vehicle for receiving optical signals; and
   a threat detect output module coupled to the electromagnetic detector arrangement and to the optical sensor arrangement, wherein the threat detect output module is configured to generate a threat detect output signal if an optical signal indicative of a threat to the vehicle, from a detonation of a land mine buried beneath the surface on which the vehicle traverses, is received within a pre-determined window period after an electromagnetic signal in a frequency range between 2 MHz and 8 MHz, indicative of a threat to the vehicle, from a detonation of a land mine buried beneath the surface on which the vehicle traverses, is received, wherein the threat detect output signal generated by the threat detect output signal is indicative of the detonation of a land mine adjacent or under the vehicle.

18. A system as claimed in claim 17, wherein the threat detect output module is configured in one or both of an analogue and digital fashion to:

determine that a received electromagnetic signal satisfies a pre-determined condition associated with an electromagnetic signal being indicative of a threat;

determine that a received optical signal satisfies a pre-determined condition associated with an optical signal being indicative of a threat; and generate a threat detect output in response to determining that the received optical signal satisfies the pre-determined condition in the pre-determined window period subsequent to determining that the received electromagnetic signal satisfies the pre-determined condition.

19. A system as claimed in claim 18, wherein the pre-determined condition associated with the received electromagnetic signal includes a pre-determined condition selected from a group comprising a pre-determined frequency condition, a pre-determined amplitude condition, and pre-determined power content or energy density condition associated with the electromagnetic signal.

20. A system as claimed in claim 19, wherein the threat detect output module is configured to determine that the received electromagnetic signal satisfies the pre-determined frequency condition by determining that the electromagnetic signal has a frequency of 5 MHz.

21. A system as claimed in claim 19, wherein the threat detector output module comprises a suitable adjustable level comparator configured to be set at a pre-determined level for the detection of a particular electromagnetic signal having a particular frequency of interest.

22. A system as claimed in claim 18, wherein the pre-determined condition associated with the received optical signal includes a pre-determined condition selected from a group comprising a pre-determined wavelength condition, a pre-determined tempo condition, and pre-determined optical amplitude condition associated with the optical signal.

23. A system as claimed in claim 17, wherein the optical sensor arrangement comprises a suitable device configured to emit a coded optical signal, wherein the optical sensor arrangement is configured to receive reflections of such coded signals.

24. A system as claimed in claim 17, wherein the system comprises a blast threat interrupter operable on receipt of the threat detect output signal.

25. A vehicle comprising a system as claimed in claim 17.

* * * * *